(12) United States Patent
Budinich

(10) Patent No.: US 6,641,113 B1
(45) Date of Patent: Nov. 4, 2003

(54) LEVERAGE DEVICE AND METHODS

(76) Inventor: Michael J. Budinich, 330 SW. 43rd #K 189, Renton, WA (US) 98055

( * ) Notice: Subject to any disclaimer, the term of this patent is extended or adjusted under 35 U.S.C. 154(b) by 0 days.

(21) Appl. No.: 10/317,756

(22) Filed: Dec. 11, 2002

(51) Int. Cl.[7] ................................................. B66F 3/00
(52) U.S. Cl. ............................ 254/25; 254/131; 254/17
(58) Field of Search .......................... 254/17, 131, 25, 254/28, 131.5; 29/252

(56) References Cited

U.S. PATENT DOCUMENTS

| | | | | |
|---|---|---|---|---|
| 1,570,192 | A | * 1/1926 | Younick | 254/131 |
| 2,502,271 | A | * 3/1950 | Parker | 254/131 |
| 2,520,427 | A | * 8/1950 | Nelson | 254/131 |
| 3,049,337 | A | * 8/1962 | Griggs | 254/131 |
| D199,019 | S | * 8/1964 | Marson | D8/89 |
| 5,325,576 | A | * 7/1994 | Henderson | 29/426.5 |
| 6,302,375 | B1 | * 10/2001 | Heil et al. | 254/17 |

* cited by examiner

*Primary Examiner*—Joseph J. Hail, III
*Assistant Examiner*—Daniel Shanley

(57) ABSTRACT

A new and improved leverage device, method of making, and method of using is disclosed, in which the new and improved leverage device is for use in disassembling various items, such as, wooden pallets. The leverage device comprises: an elongated handle; a wedge foot having a tapered distal end, the proximate end of the wedge foot is attached to the distal end of the elongated handle; and a pair of side bars, the proximate end of each respective side bar is attached to a corresponding side of the lower portion of the elongated handle, each side bar extends downwardly away from the distal end of the elongated handle, wherein the pair of side bars and the elongated handle forming a three pronged fork-like configuration. The new and improved method of making the leverage device comprises the steps of attaching, connecting, getting, grinding, and welding. The new and improved method of using the leverage device comprises the steps of grabbing, locating, obtaining, positioning, pulling, pushing, repeating, and sliding.

20 Claims, 4 Drawing Sheets

LEVERAGE DEVICE AND METHODS

FIELD OF THE INVENTION

The present invention relates to tools, more particularly, to a leverage device for use in connection with prying various things apart.

DESCRIPTION OF THE PRIOR ART

Tools for disassembling various items or structures have been known for a considerable amount of time. These tools are useful in allowing a user to exert regular forces to rip items apart via prying techniques. A wide variety of leverage devices is currently available on the commercial market and an even larger number of these types of devices are known in the art of leverage devices, for example, the nail and board puller disclosed by Anderson in U.S. Pat. No. 9,35,727; the wrecking tool disclosed by Hemfling in U.S. Pat. No. 1,309,734; the pry bar disclosed by Griggs in U.S. Pat. No. 3,049,337; the lift bar disclosed by Bowlin in U.S. Pat. No. 5,176,363; the pry shovel tool for wooden pallet deck board removal disclosed by Calahan in U.S. Pat. No. 5,447,289; and the pry bar disclosed by Isley in U.S. Pat. No. D214,988.

While all of the above-described devices fulfill their respective, particular objectives and requirements, the aforementioned patents do not describe a leverage device having the proximate end of each respective side bar is attached to a corresponding side of the lower portion of the elongated handle, so that each side bar extends downwardly and away from the distal end of the elongated handle, wherein the pair of side bars and the elongated handle form a three pronged fork-like configuration. These elements would specifically match the user's particular individual needs of making it possible to use the leverage device to not only pry things apart by pulling backwards but also allow the leverage device to pry things apart by pulling sideways. The above-described patents make no provision for a leverage device having the proximate end of each respective side bar is attached to a corresponding side of the lower portion of the elongated handle, so that each side bar extends downwardly and away from the distal end of the elongated handle, wherein the pair of side bars and the elongated handle form a three pronged fork-like configuration.

Therefore, a need exists for a new and improved leverage device that can not only pry things apart by pulling backwards but also allow the leverage device to pry things apart by pulling sideways. In this respect, the leverage device according to the present invention substantially departs from the conventional concepts and designs of the prior art, and in doing so provides an apparatus primarily developed for the purpose of providing a leverage device having the proximate end of each respective side bar is attached to a corresponding side of the lower portion of the elongated handle, so that each side bar extends downwardly and away from the distal end of the elongated handle, wherein the pair of side bars and the elongated handle form a three pronged fork-like configuration.

SUMMARY OF THE INVENTION

The present device, according to the principles of the present invention, overcomes the shortcomings of the prior art by providing new and improved leverage device, method of making, and method of using is disclosed, in which the new and improved leverage device is for use in disassembling various items, such as, wooden pallets. The leverage device comprises: an elongated handle; a wedge foot having a tapered distal end, the proximate end of the wedge foot is attached to the distal end of the elongated handle; and a pair of side bars, the proximate end of each respective side bar is attached to a corresponding side of the lower portion of the elongated handle, each side bar extends downwardly away from the distal end of the elongated handle, wherein the pair of side bars and the elongated handle forming a three pronged fork-like configuration.

In view of the foregoing disadvantages inherent in the known types of leverage devices now present in the prior art, the present invention provides an improved leverage device, which will be described subsequently in great detail, is to provide a new and improved leverage device which is not anticipated, rendered obvious, suggested, or even implied by the prior art, either alone or in any combination thereof.

To attain this, the present invention essentially comprises: an elongated handle; a wedge foot having a tapered distal end, the proximate end of the wedge foot is attached to the distal end of the elongated handle; and a pair of side bars, the proximate end of each respective side bar is attached to a corresponding side of the lower portion of the elongated handle, each side bar extends downwardly away from the distal end of the elongated handle, wherein the pair of side bars and the elongated handle forming a three pronged fork-like configuration.

There has thus been outlined, rather broadly, the more important features of the invention in order that the detailed description thereof that follows may be better understood, and in order that the present contribution of the art may be better appreciated.

The invention may also include an optional buttress attached around the distal end of the elongated handle and attached to the proximate end of the wedge foot. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved leverage device that has all the advantages of the prior art leverage device and none of the disadvantages.

It is another object of the present invention to provide a new and improved leverage device that may be easily and efficiently manufactured and marketed.

An even further object of the present invention is to provide a new and improved leverage device that has a low cost of manufacture with regard to both materials and labor, and which accordingly is then susceptible of low prices of sale to the consuming public, thereby making such multi-purpose storage unit and system economically available to the buying public.

Still another object of the present invention is to provide a new leverage device that provides in the apparatuses and methods of the prior art some of the advantages thererof, while simultaneously overcoming some of the disadvantages normally associated therewith.

Even still another object of the present invention is to provide a leverage device having the proximate end of each respective side bar is attached to a corresponding side of the lower portion of the elongated handle, so that each side bar extends downwardly and away from the distal end of the elongated handle, wherein the pair of side bars and the elongated handle form a three pronged fork-like configuration. These elements make it possible to use the leverage device to not only pry things apart by pulling backwards but also allow the leverage device to pry things apart by pulling sideways.

Yet another object of the present invention to provide a new and improved method of making the leverage device comprising the steps of attaching, connecting, getting, grinding, and welding.

Lastly, it is an object of the present invention to provide a new and improved method of using the leverage device comprises the steps of grabbing, locating, obtaining, positioning, pulling, pushing, repeating, and sliding.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
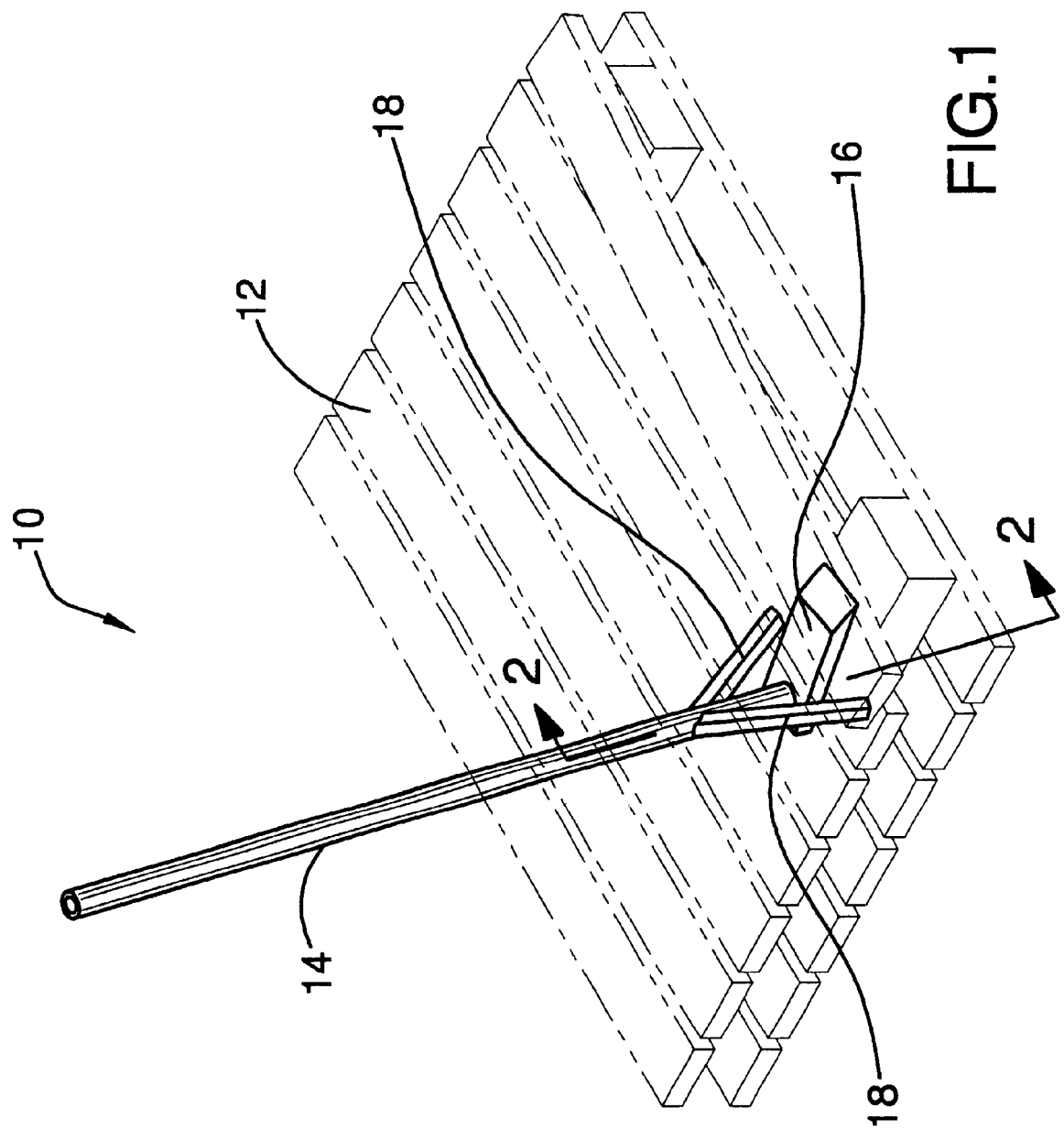
FIG. 1 is a perspective view of a preferred embodiment of the leverage device constructed in accordance with the principles of the present invention.

Referring now to the drawings, and in particular FIGS. 1 to 4 thereof, one preferred embodiment of the present invention is shown and generally designated by the reference numeral 10. One preferred embodiment of the leverage device 10 for use in disassembling items, such as, wooden pallets 12, the leverage device 10 comprising: an elongated handle 14; a wedge foot 16 having a tapered distal end, the proximate end of the wedge foot 16 is attached to the distal end of the elongated handle 14; and a pair of side bars 18, the proximate end of each respective side bar 18 is attached to a corresponding side of the lower portion of the elongated handle 14, each side bar 18 extends downwardly away from the distal end of the elongated handle 14, wherein the pair of side bars 18 and the elongated handle 14 forming a three pronged fork-like configuration.

The shape of the wedge foot 16 may be any commercially available design. One preferred configuration of the shape of the wedge foot 16 is that it comprises a substantially rectangular flat element having a tapered distal end. Another preferred configuration of the shape of the wedge foot 16 is that the thickness of the wedge foot 16 is at least one inch. Still another preferred configuration of the shape of the wedge foot 16 is that the length of the wedge foot 16 is at least four inches. Yet another preferred configuration of the shape of the wedge foot 16 is that the length of the wedge foot 16 is less than eight inches. Still yet another preferred configuration of the shape of the wedge foot 16 is that the wedge foot 16 comprises a substantially rectangular element having a tapered distal end.

The alignment of the positioning of the each respective side bar 18 may be any alignment as long as the each side bar 18 extends downwardly and away from the distal end of the elongated handle 14, so that the pair of side bars 18 and the elongated handle 14 forming a three pronged fork-like configuration. One preferred configuration of the distal end of each respective side bar 18 is that it terminates above the top surface of the wedge foot 16. Another preferred configuration of the distal end of each respective side bar 18 is that it terminates below the top surface of the wedge foot 16.

The construction of the leverage device 10 may be made from any commercially available material and any commercially known process, as long as it is sturdy enough to withstand the crushing forces exerted by the prying process of the leverage device 10. One preferred configuration of the side bar 18 is that it comprises a substantially square elongated metal rod. Likewise one preferred configuration of the device 10 is made from a die cast process. Another preferred configuration of attaching the handle is that the handle 14 is welded to the wedge foot 16. Yet another preferred configuration of attaching the side bars 18 is that each side bar 18 is welded to the handle 14.

The handle 14 may be any commercially available handle-like material, as long as the distal end of the handle 14 is able to be attached to the proximate end of the foot wedge 16. One preferred configuration is that the lower portion of the elongated handle 14 is permanently attached to the proximate end of the wedge foot 16, and the upper portion of the elongated handle 14 is made of wood. Another preferred configuration is that the upper portion of the elongated handle 14 is made of hardwood, wherein the hardwood is selected from the group consisting of oak, elm, maple, walnut, cherry, ash, and hickory. Yet another preferred configuration of the elongated handle 14 is that it is at least three feet long.

An optional buttress 20 may be added to the leverage device 10. The buttress 20 is attached around the distal end of the elongated handle 14 and attached to the proximate end of the wedge foot 16.

One preferred embodiment of the method of making a leverage device 10 for use in disassembling items, such as, wooden pallets 12, the method of making comprising the steps of attaching, connecting, getting, grinding, and welding. The getting step comprises getting an elongated handle 14, a wedge foot 16, a pair of side bars 18. The grinding step comprises grinding the distal end of the wedge foot 16 into a gradually tapered shape. The attaching step comprises attaching the proximate end of the wedge foot 16 to the distal end of the elongated handle 14 so that the wedge foot 16 is substantially perpendicular to the elongated handle 14. The connecting step comprises connecting the proximate end of each respective side bar 18 to a corresponding side of the lower portion of the elongated handle 14, so that each side bar 18 extends downwardly away from the distal end of the elongated handle 14, wherein the pair of side bars 18 and the elongated handle 14 forming a three pronged fork-like configuration. The welding step comprises welding a buttress 20 around the distal end of the elongated handle 14 and attached to the proximate end of the wedge foot 16.

One preferred embodiment of the method of using a leverage device 10 for use in disassembling items, the method comprising the steps of grabbing, locating, obtaining, positioning, pulling, pushing, repeating, and sliding. The obtaining step comprises obtaining the leverage device 10 comprising: an elongated handle 14; a wedge foot 16 attached at the proximate end of the wedge foot 16 to the distal end of the elongated handle 14, wherein the distal end of the wedge foot 16 having a tapered distal end; a pair of side bars 18, the proximate end of each respective side bar 18 is attached to a corresponding side of the lower portion of the elongated handle 14, each side bar 18 extends downwardly away from the distal end of the elongated handle 14, wherein the pair of side bars 18 and the elongated handle 14 forming a three pronged fork-like configuration; and a buttress 20 attached around the distal end of the elongated handle 14 and attached to the proximate end of the wedge foot 16. The locating step comprises locating a wooden pallet 12 having multiple slats nailed together. The grabbing step comprises grabbing the elongated handle 14 of the leverage device 10. The sliding step comprises sliding the wedge foot 16 between a rear slat and a forward slat of the wooden pallet. The positioning step comprises positioning the distal end of at least one of the side bars 18 on top of the rear slats so that the wedge foot 16 positioned below forward slat. The pushing step comprises pushing backwards on the elongated handle 14 until the nails holding the forward slat to the wooden pallet 12 give way and release a portion of the forward slat from the wooden pallet. The pulling step comprises pulling sideways on the elongated handle 14 until the nails holding the forward slat to the wooden pallet 12 give way and release another portion of the forward slat from the wooden pallet 12; and The repeating step comprises repeating the steps of sliding, positioning, pushing and pulling until the forward slat is completely released from the wooden pallet.

Referring now to FIG. 1 which depicts a perspective view of a preferred embodiment of the leverage device 10 wedged into a wooden pallet 12 showing an elongated handle 14; a wedge foot 16 having a tapered distal end, the proximate end of the wedge foot 16 is attached to the distal end of the elongated handle 14; and a pair of side bars 18, the proximate end of each respective side bar 18 is attached to a corresponding side of the lower portion of the elongated handle 14, each side bar 18 extends downwardly away from the distal end of the elongated handle 14, wherein the pair of side bars 18 and the elongated handle 14 forming a three pronged fork-like configuration.

Figure 2:
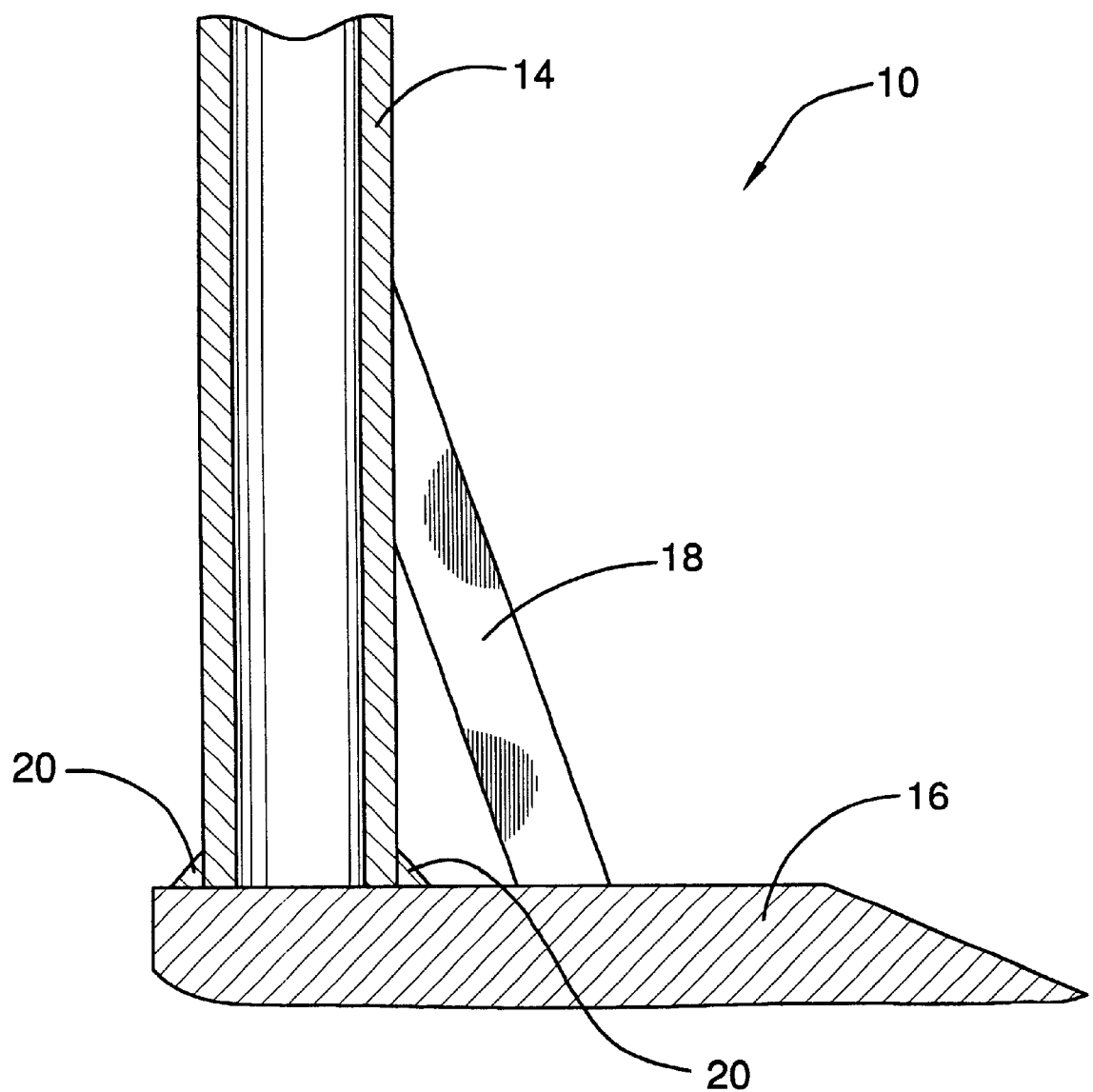
FIG. 2 is a cross section view of lower end of a preferred embodiment of the leverage device of the present invention.

Referring now to FIG. 2 which depicts a cross section view of lower end of a preferred embodiment of the leverage device 10 showing an elongated handle 14; a wedge foot 16 having a tapered distal end, the proximate end of the wedge foot 16 is attached to the distal end of the elongated handle 14; the proximate end of the side bar 18 is attached to a corresponding side of the lower portion of the elongated handle 14; and a buttress 20 attached around the distal end of the elongated handle 14 and attached to the proximate end of the wedge foot 16.

Figure 3:
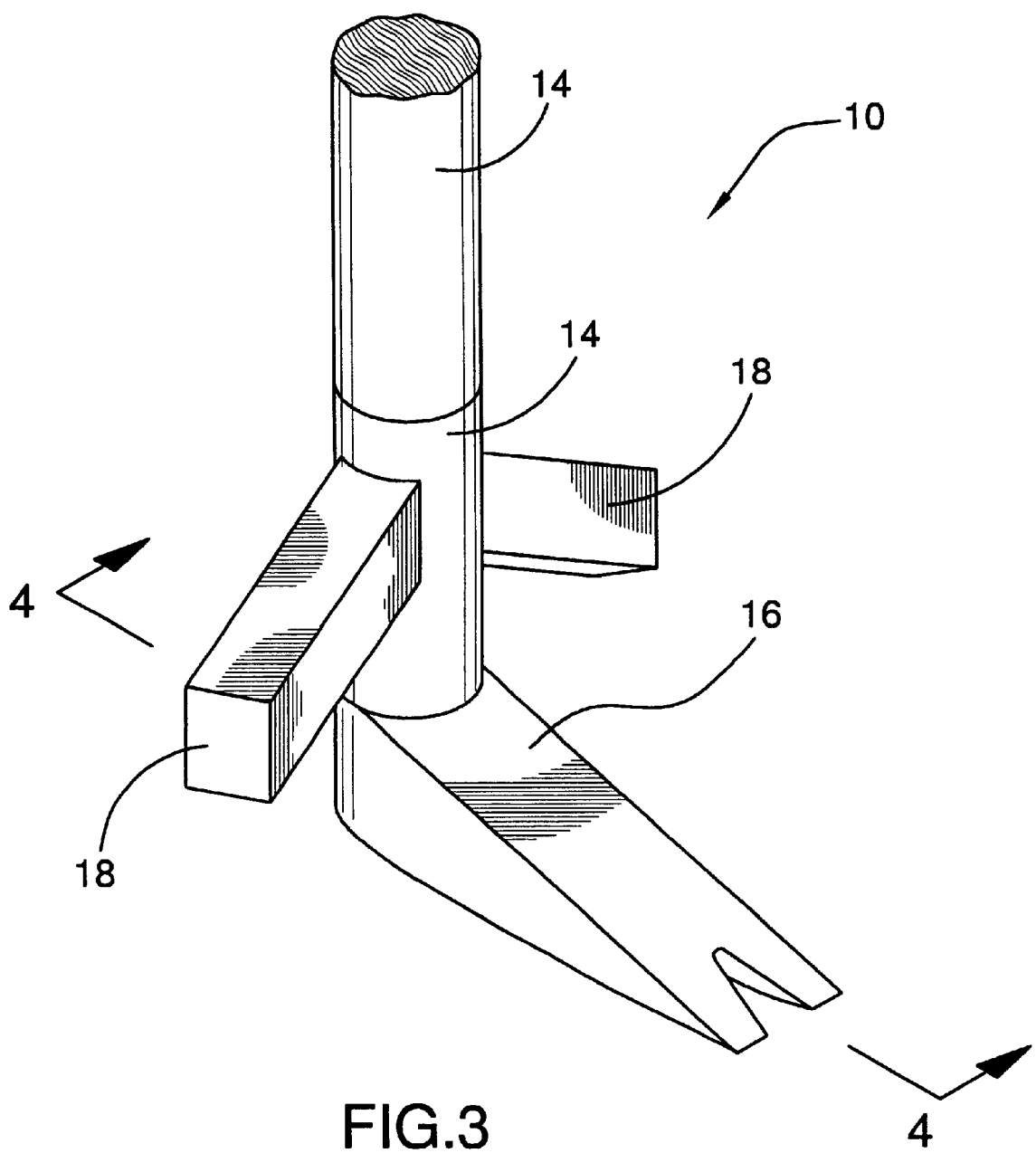
FIG. 3 is a perspective view of a lower end of a preferred embodiment of the leverage device of the present invention.
Figure 4:
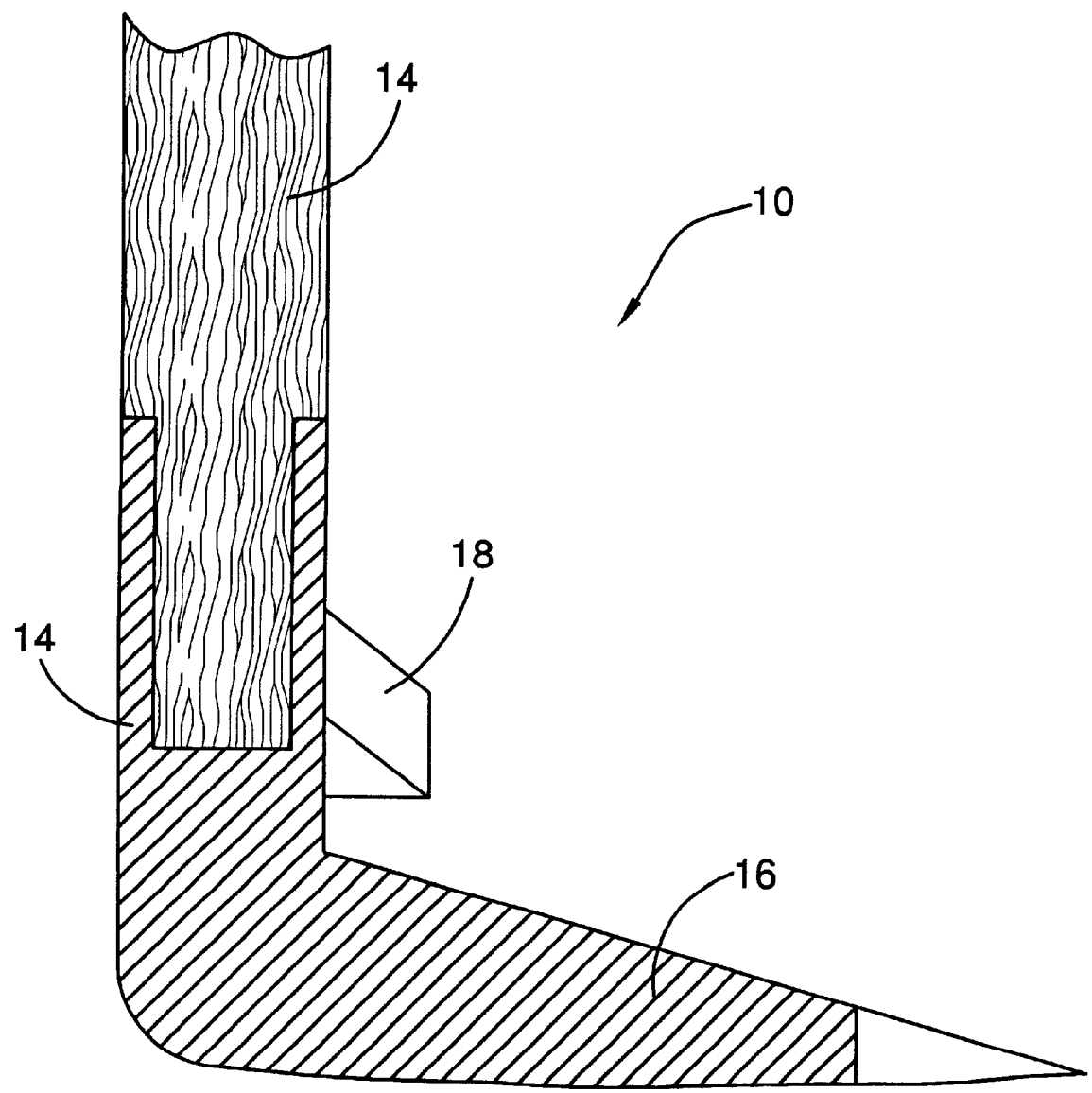
FIG. 4 is a cross sectional view of a lower end of a preferred embodiment of the the leverage device of the present invention.

Referring now to FIG. 3 and FIG. 4 which depict a perspective view and cross sectional view, respectively, of a lower end of a preferred embodiment of the leverage device 10 showing an elongated handle 14; a wedge foot 16 having a tapered distal end, the proximate end of the wedge foot 16 is attached to the distal end of the elongated handle 14; and a pair of side bars 18, the proximate end of each respective side bar 18 is attached to a corresponding side of the lower portion of the elongated handle 14, each side bar 18 extends downwardly away from the distal end of the elongated handle 14, wherein the pair of side bars 18 and the elongated handle 14 forming a three pronged fork-like configuration. The upper portion of the elongated handle 14 is shown made of wood.

As to the manner of usage and operation of the present invention, the same should be apparent from the above description. Accordingly, no further discussion relating to the manner of usage and operation will be provided.

While a preferred embodiment of the leverage device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A leverage device for use in disassembling items, such as, wooden pallets, said leverage device comprising:
an elongated handle;
a wedge foot having a tapered distal end, the proximate end of said wedge foot is attached to the distal end of said elongated handle; and
a pair of side bars, the proximate end of each respective side bar is attached to a corresponding side of the lower portion of said elongated handle, each side bar extends downwardly away from the distal end of said elongated handle, wherein said pair of side bars and said elongated handle forming a three pronged fork-like configuration.

2. The leverage device described in claim 1 further comprising a buttress attached around the distal end of said elongated handle and attached to the proximate end of said wedge foot.

3. The leverage device described in claim 1 wherein said wedge foot comprises a substantially rectangular flat element having a tapered distal end.

4. The leverage device described in claim 3 wherein the thickness of said wedge foot is at least one inch.

5. The leverage device described in claim 4 wherein the length of said wedge foot is at least four inches.

6. The leverage device described in claim 5 wherein the length of said wedge foot is less than eight inches.

7. The leverage device described in claim 1 wherein said wedge foot comprises a substantially rectangular element having a tapered distal end.

8. The leverage device described in claim 1 wherein the distal end of each respective side bar terminating above the top surface of said wedge foot.

9. The leverage device described in claim 1 wherein the distal end of each respective side bar terminating below the top surface of said wedge foot.

10. The leverage device described in claim 1 wherein the lower portion of said elongated handle is permanently attached to the proximate end of said wedge foot, and the upper portion of said elongated handle is made of wood.

11. The leverage device described in claim 10 wherein the upper portion of said elongated handle is made of hardwood.

12. The leverage device described in claim 11 wherein said hardwood is selected from the group consisting of oak, elm, maple, walnut, cherry, ash, and hickory.

13. The leverage device described in claim 1 wherein each side bar comprises a substantially square elongated metal rod.

14. The leverage device described in claim 1 wherein said device is made from a die cast process.

15. The leverage device described in claim 1 wherein said handle is welded to said wedge foot.

16. The leverage device described in claim 1 wherein each side bar is welded to said handle.

17. The leverage device described in claim 15 wherein each side bar is welded to said handle.

18. The leverage device described in claim 1 wherein said elongated handle is at least three feet long.

19. A method of making a leverage device for use in disassembling items, such as, wooden pallets, said method of making comprising the steps of:
getting an elongated handle, a wedge foot, a pair of side bars;
grinding the distal end of the wedge foot into a gradually tapered shape;
attaching the proximate end of said wedge foot to the distal end of said elongated handle so that the wedge foot is substantially perpendicular to the elongated handle;
connecting the proximate end of each respective side bar to a corresponding side of the lower portion of said elongated handle, so that each side bar extends downwardly away from the distal end of said elongated handle, wherein said pair of side bars and said elongated handle forming a three pronged fork-like configuration; and
welding a buttress around the distal end of said elongated handle and attached to the proximate end of said wedge foot.

20. A method of using a leverage device for use in disassembling items, said method comprising the steps of:
obtaining the leverage device comprising:
an elongated handle;
a wedge foot attached at the proximate end of said wedge foot to the distal end of said elongated handle, wherein the distal end of the wedge foot having a tapered distal end;
a pair of side bars, the proximate end of each respective side bar is attached to a corresponding side of the lower portion of said elongated handle, each side bar extends downwardly away from the distal end of said elongated handle, wherein said pair of side bars and said elongated handle forming a three pronged fork-like configuration; and
a buttress attached around the distal end of said elongated handle and attached to the proximate end of said wedge foot;
locating a wooden pallet having multiple slats nailed together;
grabbing the elongated handle of the leverage device;
sliding the wedge foot between a rear slat and a forward slat of the wooden pallet;
positioning the distal end of at least one of the side bars on top of the rear slats so that the wedge foot positioned below forward slat;
pushing backwards on the elongated handle until the nails holding the forward slat to the wooden pallet give way and release a portion of the forward slat from the wooden pallet; and
pulling sideways on the elongated handle until the nails holding the forward slat to the wooden pallet give way and release another portion of the forward slat from the wooden pallet; and
repeating said steps of sliding, positioning, pushing, and pulling until the forward slat is completely released from the wooden pallet.

* * * * *